(12) United States Patent
Tran et al.

(10) Patent No.: US 8,340,217 B1
(45) Date of Patent: Dec. 25, 2012

(54) CONFIGURABLE SEARCH ENGINE START/STOP MECHANISM PROVIDES FLEXIBLE RANGES OF SEARCH FOR GPS C/A CODE

(75) Inventors: Tai Tran, Irvine, CA (US); Mikko Laiho, Tampere, FL (US); Ilkka Saastamoinen, Tampere, FL (US)

(73) Assignee: QUALCOMM Incorporated, San Diego, CA (US)

( * ) Notice: Subject to any disclaimer, the term of this patent is extended or adjusted under 35 U.S.C. 154(b) by 771 days.

(21) Appl. No.: 12/257,141

(22) Filed: Oct. 23, 2008

Related U.S. Application Data (60) Provisional application No. 60/981,890, filed on Oct. 23, 2007.

(51) Int. Cl.
*H04L 27/00* (2006.01)
(52) U.S. Cl. ........ 375/316; 375/130; 375/295; 375/322; 375/342; 375/343
(58) Field of Classification Search .................. 375/130, 375/132, 135, 136, 138, 140, 145–147, 150, 375/219, 259, 316, 322, 342, 343, 340
See application file for complete search history.

(56) References Cited

U.S. PATENT DOCUMENTS

| | | | | |
|---|---|---|---|---|
| 7,630,430 B2* | 12/2009 | Bochkovskiy et al. | ........ | 375/150 |
| 7,684,473 B2* | 3/2010 | Walton et al. | .................. | 375/150 |
| 8,063,819 B2* | 11/2011 | Uchida | ..................... | 342/357.68 |
| 8,243,772 B2* | 8/2012 | Knight et al. | .................. | 375/130 |
| 2006/0067451 A1* | 3/2006 | Pollman et al. | ................ | 375/367 |
| 2007/0008217 A1* | 1/2007 | Yang et al. | ................ | 342/357.12 |
| 2007/0058591 A1* | 3/2007 | Lamance et al. | .............. | 370/335 |
| 2007/0274375 A1* | 11/2007 | Ray et al. | ....................... | 375/148 |
| 2008/0068264 A1* | 3/2008 | Banh | ........................ | 342/357.15 |
| 2010/0067564 A1* | 3/2010 | Zhang | ........................... | 375/148 |

* cited by examiner

*Primary Examiner* — Hirdepal Singh
(74) *Attorney, Agent, or Firm* — Bay Area Technology Law Group PC (57) ABSTRACT

A method and apparatus for reconfiguring a GPS receiver. A device in accordance with the present invention comprises a Radio Frequency (RF) section, the RF section adaptable to receive at least one GPS signal from at least one GPS satellite; and a baseband section, coupled to the RF section, the baseband section comprising at least one correlator, wherein the at least one correlator is adaptable to reacquire the at least one GPS signal based on a priori knowledge of the at least one GPS signal.

20 Claims, 7 Drawing Sheets

CONFIGURABLE SEARCH ENGINE START/STOP MECHANISM PROVIDES FLEXIBLE RANGES OF SEARCH FOR GPS C/A CODE

CROSS-REFERENCE TO RELATED APPLICATIONS

This application claims the benefit under 35 U.S.C. Section 119(e) of U.S. Provisional Application Ser. No. 60/981,890, filed on Oct. 23, 2007, by Tai Tran et al., entitled "CONFIGURABLE SEARCH ENGINE START/STOP MECHANISM PROVIDES FLEXIBLE RANGES OF SEARCH FOR GPS C/A CODE," which application is incorporated by reference herein.

BACKGROUND OF THE INVENTION

1. Field of the Invention

The present invention relates generally to Global Positioning System (GPS) receivers, and in particular, to a GPS receiver with a configurable search engine.

2. Description of the Related Art

The use of GPS in consumer products has become commonplace. Hand-held devices used for mountaineering, automobile navigation systems, and GPS for use with cellular telephones are just a few examples of consumer products using GPS technology.

GPS-enabled devices, such as cellular telephones, have also been introduced into the consumer marketplace. These devices allow for the use of Location-Based Services (LBS) which are services, advertisements, and other features that are offered based on the location of the user. As such, GPS-enabled devices are used worldwide.

One of the most pressing problems with GPS devices is that it takes a certain amount of time to initially acquire satellites, and, when the satellite signals are lost, that it is sometimes difficult and time consuming to find the satellite signals again. The search engine of the GPS receiver, typically a correlator, compares a block of known code against the signal and looks for a correlation between the received signal and the known code, and does this search over a given frequency range and a given time. However, little or no intelligence about the prior signals is used to shorten the time to find satellites a second or subsequent time.

It can be seen, then, that there is a need in the art to make GPS-enabled devices that shorten the reacquisition time for satellites in a GPS device-based system.

SUMMARY OF THE INVENTION

To minimize the limitations in the prior art, and to minimize other limitations that will become apparent upon reading and understanding the present specification, the present invention describes a GPS receiver. A Global Positioning System (GPS) receiver in accordance with one or more embodiments of the present invention comprises a Radio Frequency (RF) section, the RF section adaptable to receive at least one GPS signal from at least one GPS satellite, and a baseband section, coupled to the RF section, the baseband section comprising at least one correlator, wherein the at least one correlator includes a programmable start search value and a programmable end search value, the programmable start search value and the programmable end search value being used to acquire the at least one GPS signal from the at least one GPS satellite.

Such a GPS receiver further optionally comprises the programmable start value being set at a beginning of a Coarse Acquisition (C/A) code word, the programmable end value being set at an end of the C/A code word, the programmable end value being set within the C/A code word, the programmable start value being set within a first Coarse Acquisition (C/A) code word, and the programmable end value being set within a second C/A code word, the second C/A code word arriving after the first C/A code word, the programmable start value being set equal to the programmable end value, and a bit resolution of the correlator being programmable.

A programmable search engine in accordance with one or more embodiments of the present invention comprises a local code generator for generating a local code having a first phase; and at least one correlator, coupled to the local code generator, for comparing a received spread spectrum signal with the local code, wherein the at least one correlator includes a programmable start search value and a programmable end search value, the programmable start search value and the programmable end search value being used to acquire the spread spectrum signal.

Such a search engine further optionally comprises the programmable start value being set at a beginning of a code word of the local code, the programmable end value being set at an end of the code word, the programmable end value being set within the code word, the programmable start value being set within a first code word, and the programmable end value being set within a second code word, the second code word arriving after the first code word, the programmable start value being set equal to the programmable end value, and a bit resolution of the correlator being programmable.

A method for acquiring a GPS signal in accordance with one or more embodiments of the present invention comprises generating a local code having a first phase, programming a start value and an end value of the local code into a correlator; and comparing at least a portion of the GPS signal with the local code, starting at the start value and ending at the end value, to determine if the first phase is aligned with a phase of the GPS signal.

Such a method further optionally comprises the programmable start value being set at a beginning of a code word of the local code, the programmable end value being set at an end of the code word, the programmable end value being set within the code word, the programmable start value being set within a first code word, and the programmable end value being set within a second code word, the second code word arriving after the first code word, and a bit resolution of the correlator being programmable.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Figure 1:
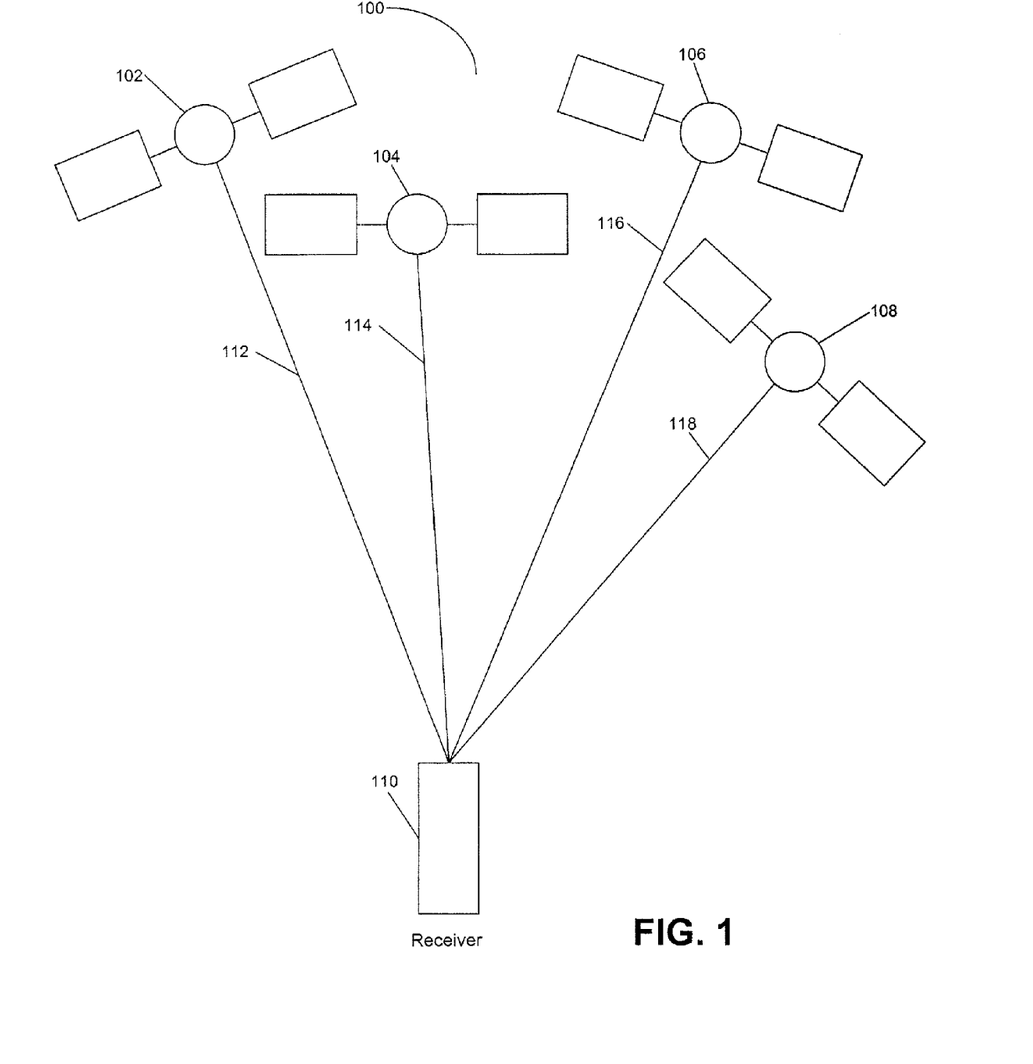
FIG. 1 illustrates a typical Satellite Positioning System in accordance with the present invention.

FIG. 1 illustrates a typical Satellite Positioning System in accordance with the present invention.

System 100 illustrates a constellation of satellites 102-108 and a receiver 110. Each of the satellites 102-108 transmits a signal 112-118 respectively, which signals 112-118 are received by receiver 110.

Signals 112-118 contain information such as time of transmission and system time for system 100. Receiver 110 uses the time it takes for signals 112-118 to travel the distances between the satellites 102-108 and receiver 110 and the data within signals 112-118 to determine the x, y, and z coordinates (geoposition) of receiver 110. This generic ranging system is typically known as the Global Positioning System (GPS), which is described in the related art.

The frequencies of interest in a GPS system 100 are in the "L-band" of frequencies, typically around 1575 MHz, but other positioning systems with other frequencies of interest can also benefit from the present invention.

Transmitter Portion

Figure 2:
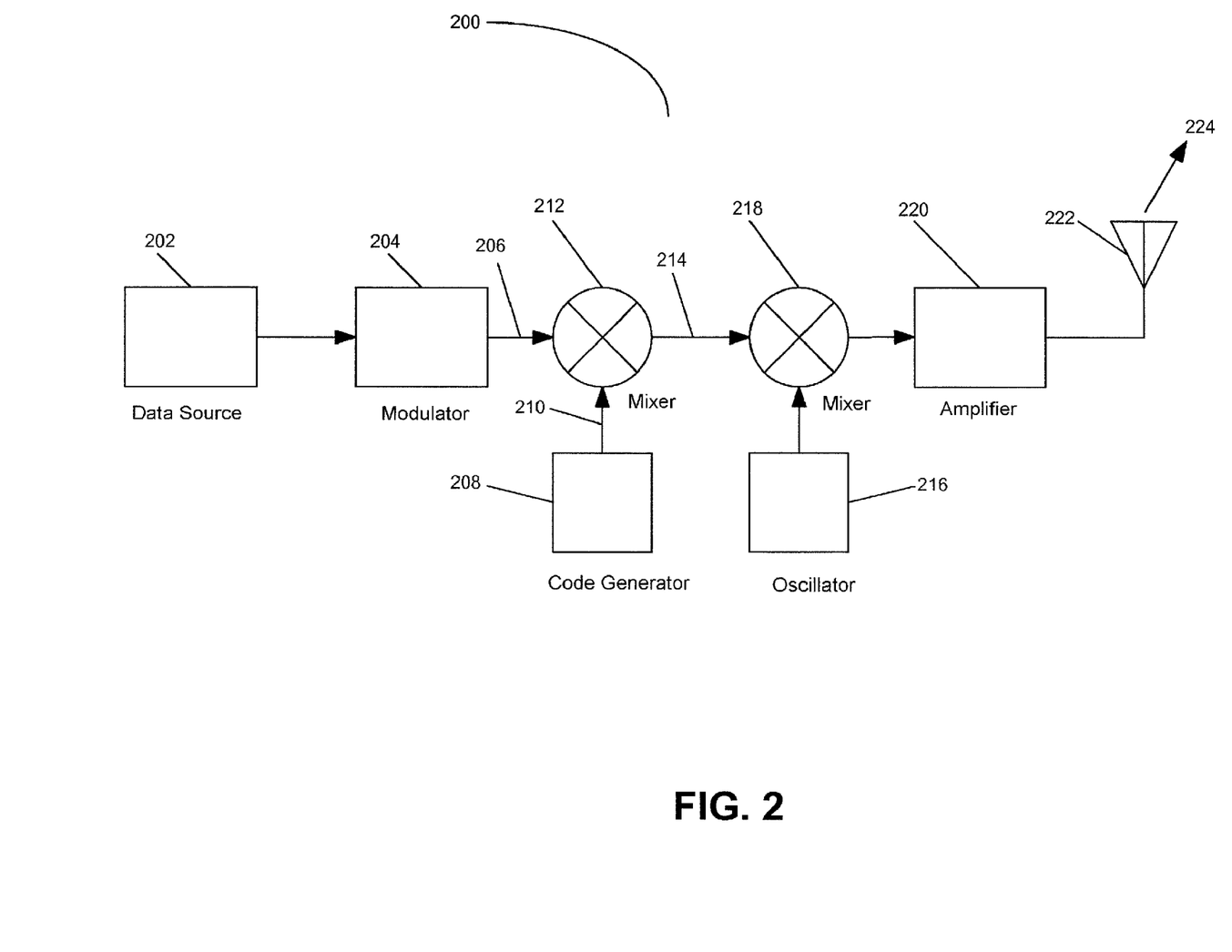
FIG. 2 illustrates a block diagram of a direct sequence-based spread spectrum system.

FIG. 2 illustrates a block diagram of a direct sequence-based spread spectrum system. In transmitter 200, a signal from a data source 202 is first modulated in a data modulator 204 of transmitter 200 and generates signal 206. A spreading code generator 208 generates a complex spreading code 210 which is mixed with signal 206 to generate a spread signal 214 by mixing the signal 206 with the spreading code 210. This mixing operation at mixer 212 "spreads" the signal 206 across a frequency spectrum of predetermined frequencies.

Spread signal 214 is then mixed with the output of a Radio Frequency (RF) oscillator 216 at mixer 218, and then amplified by amplifier 220 before being transmitted by antenna 222. Transmitted signal 224 is then transmitted, and transmitted signal 224 (signals 112-118 of FIG. 1) is a spread spectrum signal that is modulated around the RF oscillator 216 frequency.

Receiver Portion

Figure 3:
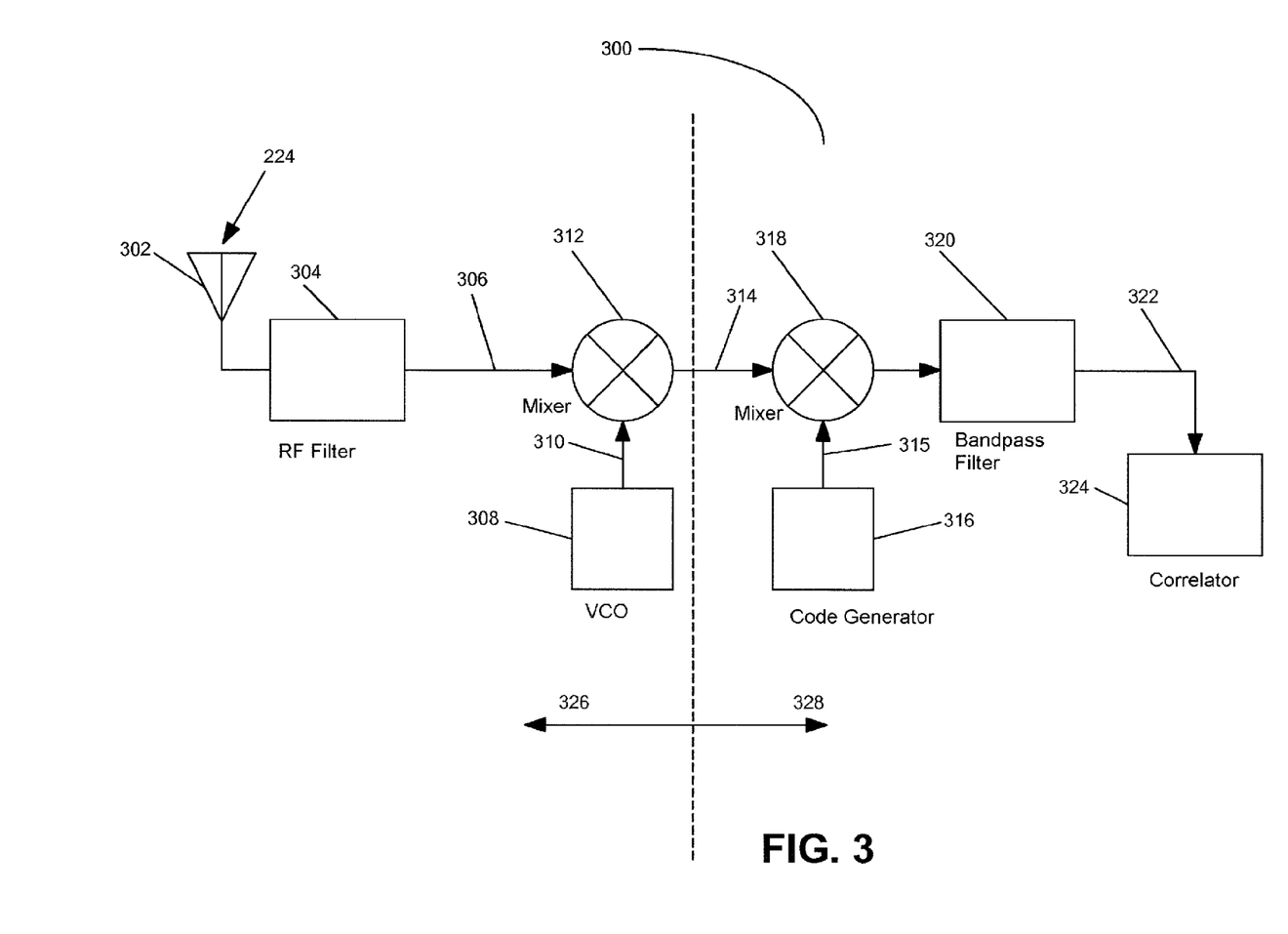
FIG. 3 illustrates a receiver portion of a system in accordance with the present invention.

FIG. 3 illustrates a receiver portion of a system in accordance with the present invention.

The transmitted signal 224 is received at antenna 302 and filtered through a RF filter 304 to find signal 224 out of the entire frequency spectrum that is received by antenna 302. This filtered signal 306 is then mixed with a Voltage Controlled Oscillator (VCO) 308 output 310 to downconvert the filtered signal 306 to a lower frequency signal 314 for processing.

An output 315 from a spread spectrum code generator 316 is then mixed with signal 314 at mixer 318, and filtered at bandpass filter 320, to "despread" the signal 224 into signal 322. The signal 315 is a replica of the spreading code generated by code generator 208, and, when the signal 315 and signal 206 are identical and in-phase with each other, the signals 206 and 315 correlate and the transmitted data modulation present on signal 224 can be restored prior to the mixing of signal 210 and signal 206. However, if the signal 206 and signal 315 are either out of phase or not identical, the signals do not correlate, and the transmitted data modulation will not be properly restored. Regardless of the correlation between signal 315 and signal 206, other spurious signals are also despread, and bandpass filter 320 removes those spurious signals from being processed by the data detection circuitry. The bandpass filter 320 allows the data modulation to pass through to the data detection circuitry. Signal 322 is then sent to a data detector (correlator) 324 to locate the data present in signal 224.

In order to enable the detection of transmitted data 224 in a spread spectrum receiver 300, the code replica generated by the code generator 316 in receiver 300 has to be synchronized with the received code as accurately as possible to perform an "acquisition" of a signal, and said synchronization has to be maintained for receiver 300 to "track" signal 224. The spreading code replica generated in the code generator 316 thus has to be at the proper frequency, be in phase with, and stay in phase with the spreading code included in the received signal 224. For this reason, a special synchronization algorithm or unit is required for code synchronization, in addition to regular carrier and data synchronization. The speed of the acquisition, i.e. the time taken by the code replica to hit the right frequency and phase with the received code 224, is an important performance parameter of a spread spectrum system. Many methods have been developed for the acquisition, in addition to which the system may comprise different aids for the acquisition that are related to the transmitted signal.

Typically, the code generator 316 is stepped in time, e.g., by delaying and or advancing the beginning of the despreading code generated by the code generator, to alter the phase of the output signal 315 of the code generator 316. The frequency range of the output signal 315 is chosen based on the expected receive frequency of signal 224. The expected receive frequency is typically determined by RF oscillator 216 and VCO 308, which use frequencies that are known by receiver 300, to look in different "frequency bins" to find the signal 224. "Finding" the signal means matching the output signal 315 phase and frequency to that of the signal 224 during comparison in the correlator 324. Although shown as a single correlator 324, multiple correlators 324 are represented by the correlator 324 shown in FIG. 3.

Typically, the receiver 300 has two sections, an RF section 326 and a baseband section 328. At times, the RF section 326 is on a first integrated circuit chip and the baseband section 328 is on a different integrated circuit chip, but the RF section 326 and the baseband section 328 can be located on a single integrated circuit chip if desired.

Search Strategy

Figure 4:
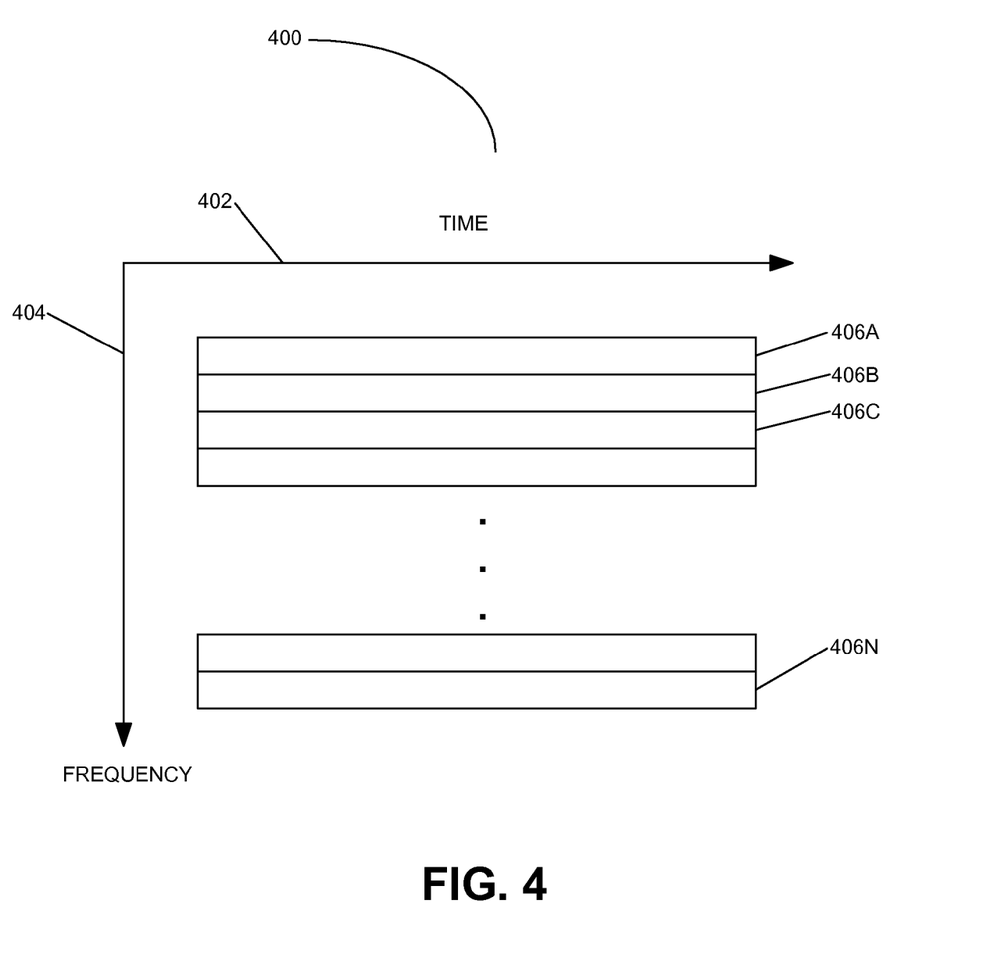
FIG. 4 illustrates a typical stepping of the frequency as performed in the related art.

FIG. 4 illustrates a typical stepping of the frequency as performed in the related art.

Chart 400 illustrates a time axis (code phase axis) 402 and a frequency axis 404. Within chart 400, a receiver 300 correlator 324 searches through time and frequency "bins" 406A-406N by comparing a known sequence generated by generator 316 to signals 224 (signals 112-118).

As receiver 300 searches through a specific bin, e.g., bin 406A, receiver 300 starts with typically the lowest frequency and the lowest phase that a given signal 224 can be located in, and the upper edge of the bin 406A is chosen such that the entire signal 224, or a portion of signal 224, will fit within the bin 406A. So, typically, once the correlation between signal 316 and signal 224 is determined by correlator 324 (based on the characteristics of signal 322), the receiver 300 determines whether or not the phase of code generator 316 is correct. If not, the next bin 406B is chosen, and the phase of code generator 316 is changed, and another determination is made.

This comparison continues until a threshold value of comparison is reached, which means that the phase of code generator 316 is approximately that of generator 208, and tracking of the signal 224 by receiver 300 can begin.

Figure 5:
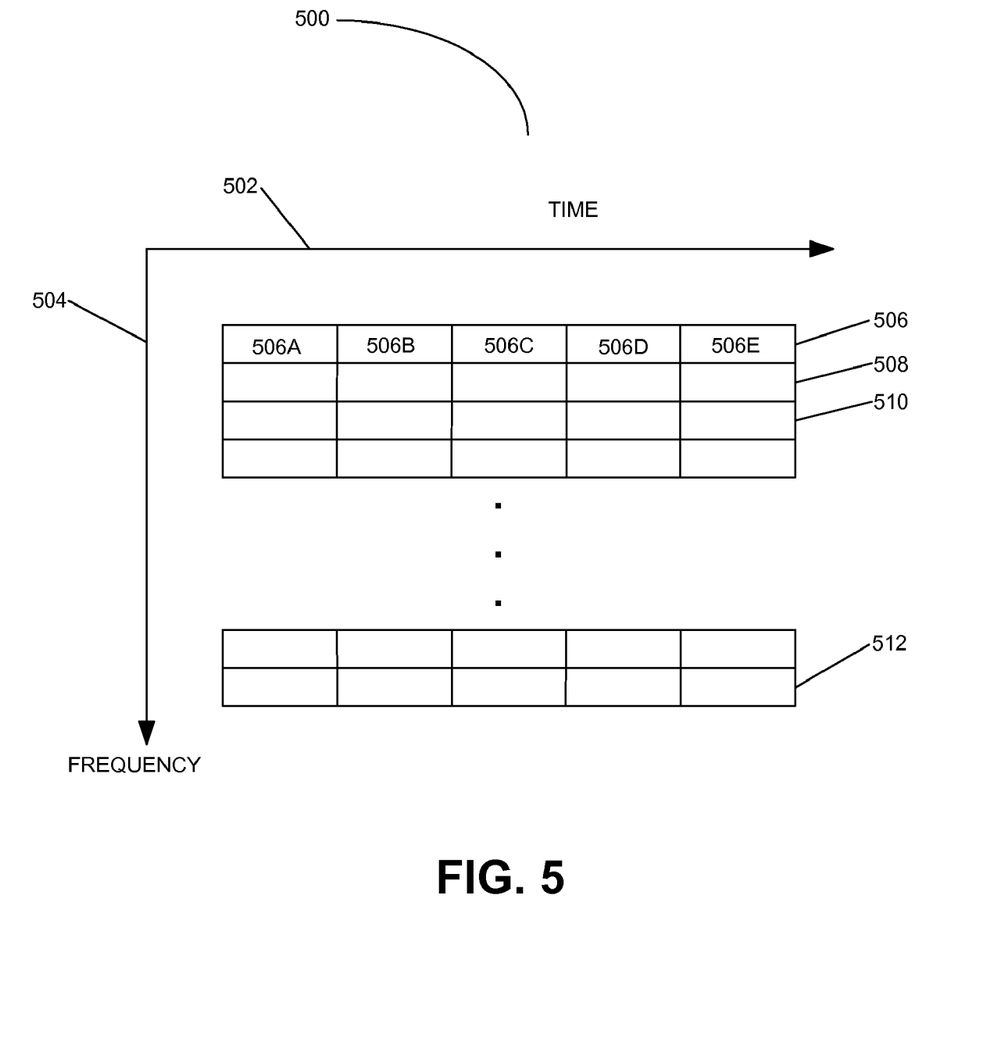
FIG. 5 illustrates another search strategy of the related art.

FIG. 5 illustrates another search strategy of the related art.

Chart 500 illustrates a time axis (code phase axis) 502 and a frequency axis 504. Within chart 500, a receiver 300 searches through time and frequency "bins" 506-512 by comparing a known sequence generated by generator 316 to signals 224 (signals 112-118).

However, now each frequency bin 506-512 is broken down into smaller code phase (range) segments, such that multiple correlators can look at a given signal at the same time. So, for example, as receiver 300 searches through specific bins, e.g., bins 506A through 506E, receiver 300 can look through each of the smaller code phase bins 506A-506E in parallel by using multiple correlators 324 and determine with greater speed where signal 224 is, i.e., what phase delay or advance must be applied to code generator 316 to "find" signal 224.

This parallel search can then be used again if the signal is not located in row 506, by applying the parallel correlators 324 to bin 508, bin 512, etc. until all of the possible frequency and phase locations have been searched or the signal 224 is located.

The approach of FIG. 5 speeds up the initial acquisition by being able to search through the same amount of signal space in a 1/m fashion, where m is the number of correlators. As such, the system of FIG. 5 is m times faster in initial acquisition.

However, after the signal 224 is lost for some reason, e.g., receiver 300 enters a tunnel or is otherwise blocked from seeing signal 224 or other signals 112-118, the receiver 300 typically starts all over again with a new acquisition, and the signals from all of the satellites 102-108 must be found again. In some systems, the receiver 300 is programmed to jump right to the frequency bin 406A-406N, or to the frequency slot 506-512, where the signal 224 was located just prior to the loss of signal 224. However, since typical receivers 300 track several signals 224 simultaneously, the receiver 300 must do this reacquisition sequentially; first find signal 112 from satellite 102, then find signal 114 from satellite 104, etc.

The present invention allows for receivers 300 to reconfigure the searching capabilities of the receiver 300 of the present invention to reacquire signals 112-118 (collectively called signals 224) simultaneously by allowing each of the frequency bins to be searched regardless of the bin's location within the time-frequency graph.

Even in situations where two search engines in a given receiver 300 need to be chained together in order to conduct a search (often called a "dual-dwell" search) typically due to larger code phase uncertainty, the reconfigurable nature of the present invention allows a smaller search engine to perform the second dwell (also known as the "verification round") regardless of how many engines were used during the first dwell. This approach which is enabled by the present invention allows the remainder of the search engine to be shut down to save power, or used to find other signals to allow for faster acquisition speeds.

Figure 6:
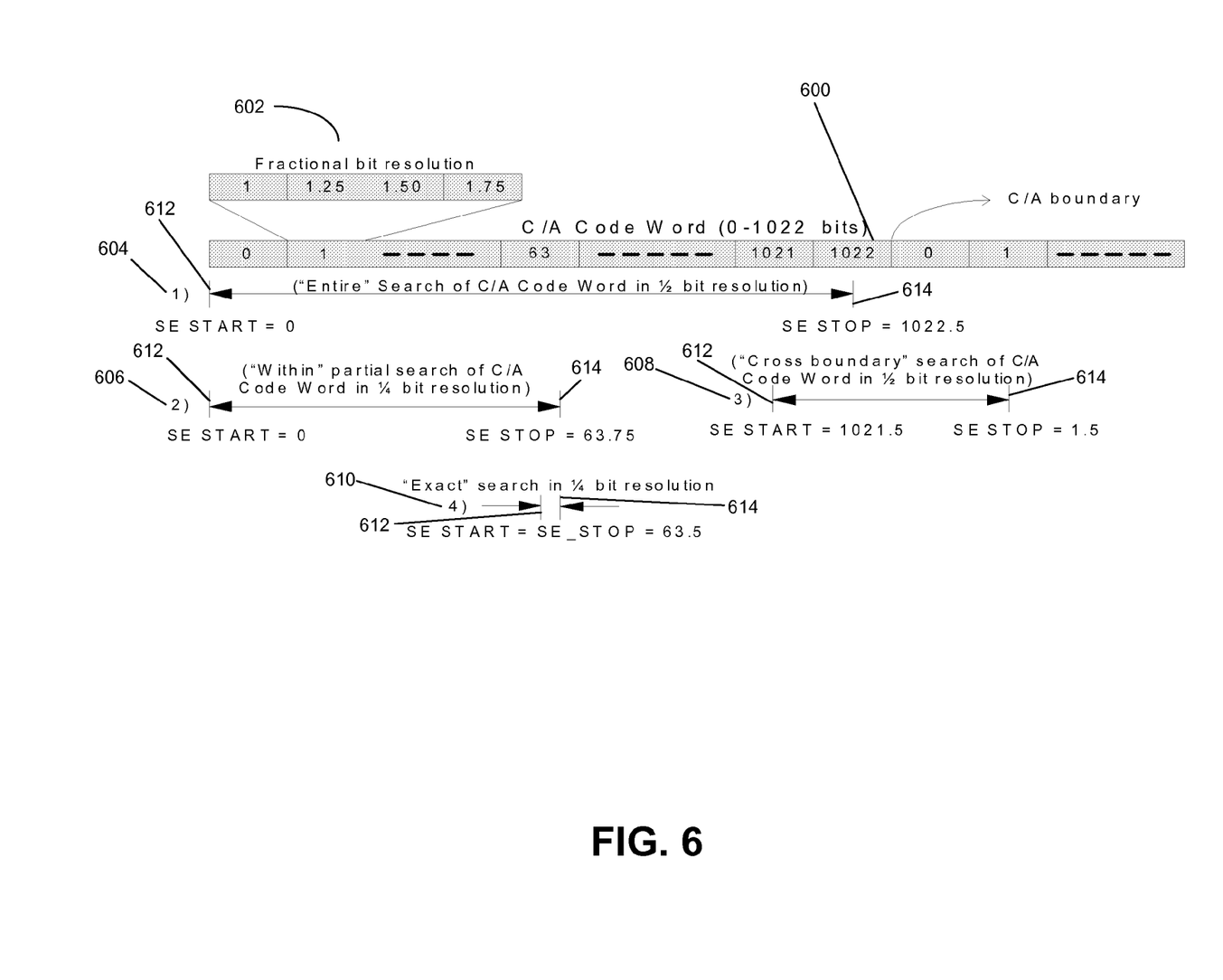
FIG. 6 illustrates a configurable search start/stop mechanism in accordance with the present invention.

FIG. 6 illustrates a configurable search start/stop mechanism in accordance with the present invention.

Figure 7:
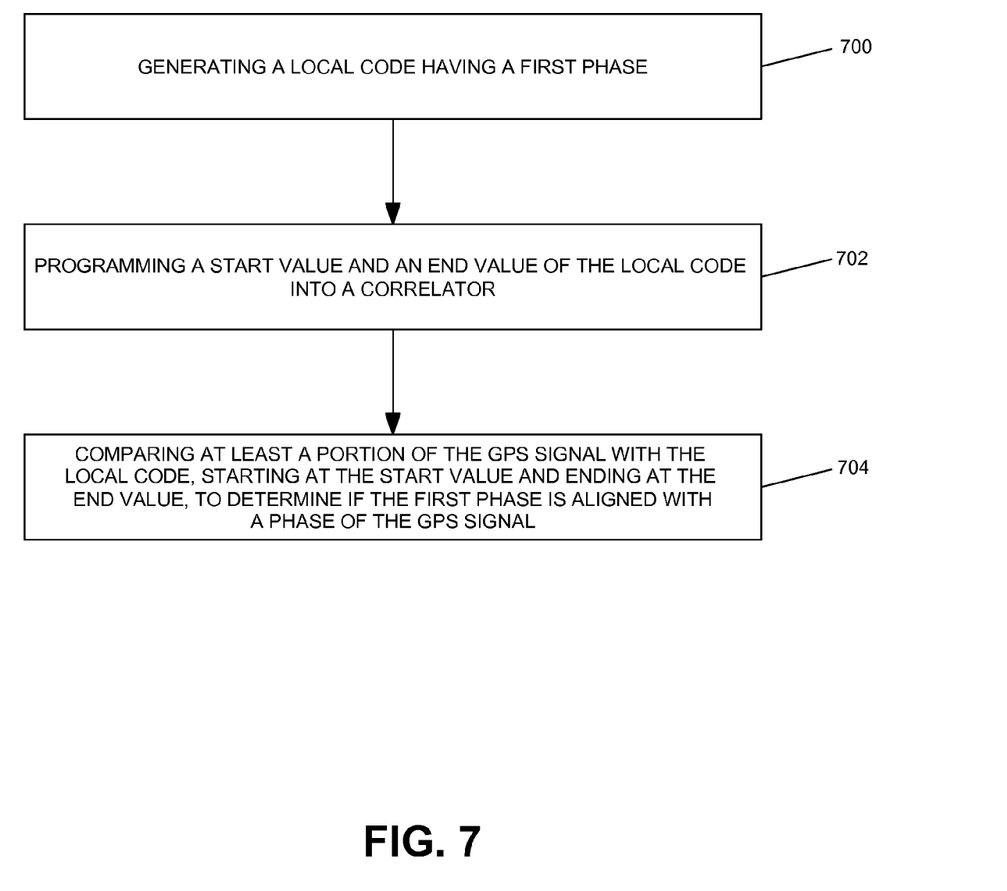
FIG. 7 illustrates a process chart in accordance with one or more embodiments of the present invention.

Typically, satellites 102-108 (shown in FIG. 1) are acquired by capturing the received Coarse Acquisition (C/A) code word (1023 bit length) and multiplying the received C/A code word with the locally generated C/A code word (as shown in FIG. 4). The result from multiplication and code phase shift determines the peak of the GPS signal. This long sequential process requires the hardware to compute each step in unit of ¼ or 'A bit resolution spanning across the entire C/A code word. So, for example, FIG. 7 shows a smaller part of the C/A code word being searched.

With the configurable Search Start/Stop of the present invention, the user has flexible methods of search for wide ranges of C/A code. The ranges of search can be the entire code word, within the code word, across the boundary of the code word, and exact searches in smaller resolutions of the code word.

Code word 600 is shown, with fractional bit resolution frame 602. A ¼ bit resolution is defined as a unit step of 0.25 bits, etc. The fractional scale for the C/A code word 600 in ¼ bit resolution would be [0, 0.25, 0.5, 0.75, 1, 1.25, 1.5, 1.75, . . . 1022, 1022.25, 1022.5, 1022.75]. There are four possible fractional bit resolutions in fractional bit resolution frame 602, thus, a total for the C/A code word 600 is 4*1023. For a ½ bit resolution, the total C/A code word would be 2*1023. Other resolutions are possible within the scope of the present invention.

The present invention allows flexibility in commanding the search engine (correlators) to search at any bit position and for different lengths within the C/A code word 600.

Searches 604-610 illustrate the search start and search end markers for the configurable mechanism of the present invention.

Search 604 is a "standard" or 'entire" search, where the search start 612 value is set at the beginning of the C/A code word 600 (start=0) and the search end value 614 is set at the end of the C/A code word 600 (end=1022.5). Search 604 is shown in ½ bit resolution; other resolutions are possible within the scope of the present invention. Such a search is typically done at initial start up of the receiver 110, or during a cold start of receiver 110.

Search 606 is a "within" search, where the search start 612 value is set at the beginning of the C/A code word 600 (start=0) and the search end value 614 is set at a smaller portion of the C/A code word 600 (end=63.75). Search 606 is shown in ¼ bit resolution; other resolutions are possible within the scope of the present invention. Further, other start 612 and end 614 values are possible within the scope of the present invention. This partial search process shown in search 606 is normally used for fast acquisition, which reduces the power required to run the receiver 110.

Search 608 is a "cross boundary" search, where the search start 612 value is set near the end of the C/A code word 600 (start=1021.5) and the search end value 614 is set near the beginning of the next C/A code word 600 (end=1.5) such that search 608 crosses the boundary of the C/A code word 600 frame. Search 608 is shown in ½ bit resolution; other resolutions are possible within the scope of the present invention. Further, other start 612 and end 614 values are possible within the scope of the present invention. This allows for searching beyond the boundary of the C/A code word 600 if desired, which is not available in current receivers 110.

Search 610 is an "exact" search, where the search start 612 value is set equal to the search end value 614 of the C/A code word 600 (start=end=63.5) such that search 612 searches only one bit or one search bit resolution of the C/A code word 600. Search 610 is shown in ½ bit resolution; other resolutions are possible within the scope of the present invention. Further, other start 612 and end 614 values are possible within the scope of the present invention. Such a search allows for peak detection at a given bit position within C/A code word 600, and if the peak detection is incorrect, bit error position or signal strength parameters may be causing the inconsistency.

Process Chart

FIG. 7 illustrates a process chart in accordance with one or more embodiments of the present invention.

Box 700 illustrates generating a local code having a first phase.

Box 702 illustrates programming a start value and an end value of the local code into a correlator.

Box 704 illustrates comparing at least a portion of the GPS signal with the local code, starting at the start value and ending at the end value, to determine if the first phase is aligned with a phase of the GPS signal.

CONCLUSION

In summary, the present invention describes a GPS receiver. A Global Positioning System (GPS) receiver in accordance with one or more embodiments of the present invention comprises a Radio Frequency (RF) section, the RF section adaptable to receive at least one GPS signal from at least one GPS satellite, and a baseband section, coupled to the RF section, the baseband section comprising at least one correlator, wherein the at least one correlator includes a programmable start search value and a programmable end search value, the programmable start search value and the programmable end search value being used to acquire the at least one GPS signal from the at least one GPS satellite.

Such a GPS receiver further optionally comprises the programmable start value being set at a beginning of a Coarse Acquisition (C/A) code word, the programmable end value being set at an end of the C/A code word, the programmable end value being set within the C/A code word, the programmable start value being set within a first Coarse Acquisition (C/A) code word, and the programmable end value being set within a second C/A code word, the second C/A code word arriving after the first C/A code word, the programmable start value being set equal to the programmable end value, and a bit resolution of the correlator being programmable.

A programmable search engine in accordance with one or more embodiments of the present invention comprises a local code generator for generating a local code having a first phase; and at least one correlator, coupled to the local code generator, for comparing a received spread spectrum signal with the local code, wherein the at least one correlator includes a programmable start search value and a programmable end search value, the programmable start search value and the programmable end search value being used to acquire the spread spectrum signal.

Such a search engine further optionally comprises the programmable start value being set at a beginning of a code word of the local code, the programmable end value being set at an end of the code word, the programmable end value being set within the code word, the programmable start value being set within a first code word, and the programmable end value being set within a second code word, the second code word arriving after the first code word, the programmable start value being set equal to the programmable end value, and a bit resolution of the correlator being programmable.

A method for acquiring a GPS signal in accordance with one or more embodiments of the present invention comprises generating a local code having a first phase, programming a start value and an end value of the local code into a correlator; and comparing at least a portion of the GPS signal with the local code, starting at the start value and ending at the end value, to determine if the first phase is aligned with a phase of the GPS signal.

Such a method further optionally comprises the programmable start value being set at a beginning of a code word of the local code, the programmable end value being set at an end of the code word, the programmable end value being set within the code word, the programmable start value being set within a first code word, and the programmable end value being set within a second code word, the second code word arriving after the first code word, and a bit resolution of the correlator being programmable.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but by the claims and the equivalents of the claims which form a part of this application.

What is claimed is:

1. A Global Positioning System (GPS) receiver, comprising:
a Radio Frequency (RF) section, the RF section adaptable to receive at least one GPS signal from at least one GPS satellite; and
a baseband section, coupled to the RF section, the baseband section, comprising at least one correlator, wherein the at least one correlator includes a programmable start search value and a programmable end search value, the programmable start search value and the programmable end search value being used to acquire the at least one GPS signal from the at least one GPS satellite, wherein the programmable start search value is determined with reference to a first Coarse Acquisition (C/A) code word such that the programmable start search value and the programmable end search value is configurable to define a variable amount of the first C/A code word.

2. The GPS receiver of claim 1, wherein the programmable start search value is set at a beginning of the first C/A code word.

3. The GPS receiver of claim 2, wherein the programmable end search value is set at an end of the first C/A code word.

4. The GPS receiver of claim 2, wherein the programmable end search value is set within the first C/A code word.

5. The GPS receiver of claim 1, wherein the programmable start search value is set within the first C/A code word and wherein the programmable end search value is set within a second C/A code word, the second C/A code word arriving after the first C/A code word.

6. The GPS receiver of claim 1, wherein the programmable start search value is set equal to the programmable end search value.

7. The GPS receiver of claim 1, wherein a bit resolution of the at least one correlator is programmable.

8. A programmable search engine, comprising:
a local code generator for generating a local code having a first phase; and
at least one correlator, coupled to the local code generator, for comparing a received spread spectrum signal with the local code, wherein the at least one correlator includes a programmable start search value and a programmable end search value, the programmable start search value and the programmable end search value being used to acquire the received spread spectrum signal, wherein the programmable start search value is determined in reference to a first code word of the local code such that the programmable start search value and the programmable end search value is configurable to define a variable amount of the first code word.

9. The programmable search engine of claim 8, wherein the programmable start search value is set at a beginning of the first code word of the local code.

10. The programmable search engine of claim 9, wherein the programmable end search value is set at an end of the first code word.

11. The programmable search engine of claim 9, wherein the programmable end search value is set within the first code word.

12. The programmable search engine of claim 8, wherein the programmable start value is set within the first code word and wherein the programmable end search value is set within a second code word, the second code word arriving after the first code word.

13. The programmable search engine of claim 8, wherein the programmable start search value is set equal to the programmable end search value.

14. The programmable search engine of claim 8, wherein a bit resolution of the at least one correlator is programmable.

15. A method for acquiring a GPS signal, comprising:
generating a local code having a first phase; and
programming a start value and an end value with respect to a first code word of the local code into a correlator such that the programmable start search value and the programmable end search value is configurable to define a variable amount of the first code word;
comparing at least a portion of the GPS signal with the first code word, starting at the start value and ending at the end value, to determine if the first phase is aligned with a phase of the GPS signal.

16. The method of claim 15, wherein the programmable start search value is set at a beginning of a code word of the local code.

17. The method of claim 16, wherein the programmable end search value is set at an end of the code word.

18. The method of claim 16, wherein the programmable end search value is set within the code word.

19. The method of claim 15, wherein the programmable start search value is set within a first code word, and the programmable end search value is set within a second code word, the second code word arriving after the first code word.

20. The method of claim 15, wherein a bit resolution of the correlator is programmable.

\* \* \* \* \*